United States Patent [19]
Pointer et al.

[11] Patent Number: 4,650,318
[45] Date of Patent: Mar. 17, 1987

[54] RADIATION PYROMETER WITH GAS PURGE

[75] Inventors: John Pointer, Basingstoke; Ronald A. Masom, Southampton, both of England

[73] Assignee: Smiths Industries Public Limited Company, London, England

[21] Appl. No.: 730,916

[22] Filed: May 6, 1985

[30] Foreign Application Priority Data

May 12, 1984 [GB] United Kingdom ............... 8412219

[51] Int. Cl.$^4$ .......................... G01J 5/02; G02B 7/00
[52] U.S. Cl. ..................... 356/43; 350/582; 374/125
[58] Field of Search .................. 356/43, 44, 45; 374/121, 125, 130, 208–209; 350/584, 582

[56] References Cited

U.S. PATENT DOCUMENTS

| 2,576,514 | 11/1951 | Bianco et al. | 356/43 X |
| 3,310,356 | 3/1967 | Borberg | 350/584 |
| 3,321,265 | 5/1967 | Clave et al. | 350/584 |
| 4,306,835 | 12/1981 | Hurley | 356/43 X |
| 4,400,097 | 8/1983 | Koschnitzke et al. | 374/121 |

FOREIGN PATENT DOCUMENTS

| 620766 | 3/1949 | United Kingdom . |
| 865140 | 4/1961 | United Kingdom . |
| 1092590 | 11/1967 | United Kingdom . |
| 1589531 | 5/1981 | United Kingdom . |

Primary Examiner—Vincent P. McGraw
Attorney, Agent, or Firm—Pollock, Vande Sande and Priddy

[57] ABSTRACT

A radiation pyrometer has an inner tube with a lens mounted in a rear portion which is stepped to a forward portion of reduced diameter that is open at its forward end. An outer tube extends coaxially around the inner tube and is separated from it by an annular gas passage. The outer tube has an aperture at its forward end that is smaller that the external diameter of the forward end of the inner tube and larger than the internal diameter. The outer tube has gas inlets into the passage while are located rearwardly of the forward end of the inner tube, the area of the gas inlets being greater than the gap between the forward end of the inner tube and the outer tube. Gas flows through the inlets, along the passage, across the forward end of the inner tube and out the aperture, thereby setting up a substantially constant pressure in the rear portion of the inner tube and reducing the entry of contaminants.

9 Claims, 2 Drawing Figures

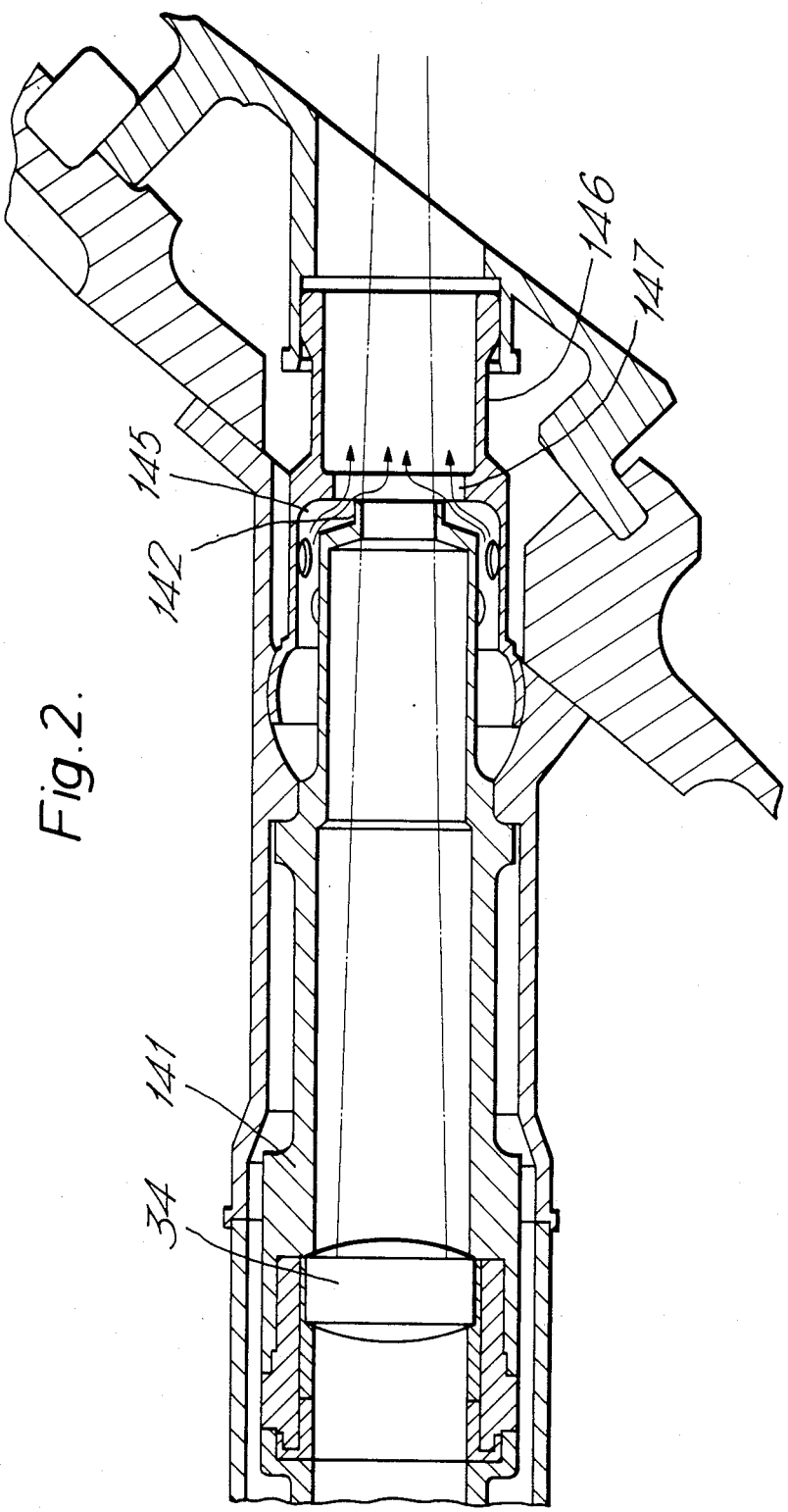

RADIATION PYROMETER WITH GAS PURGE

BACKGROUND OF THE INVENTION

This invention relates to radiation-responsive apparatus.

The invention is more particularly, but not exclusively, concerned with radiation pyrometers, such as for use in gas-turbine engines.

The temperature of the blades of a gas-turbine engine can be measured by means of a radiation pyrometer which is mounted to view the blades through an aperture in the engine casing. Such pyrometers have a lens, at one end of a tube, which focusses radiation from an individual blade, as it passes within the field of view of the pyrometer, onto a radiation sensor—either directly, or via a radiation guide, such as a fibre-optic cable. The lens is usually made of a heat-resistant material, such as sapphire, or is mounted behind a window of heat-resistant material, so as to enable it to withstand the high temperatures and temperature changes to which the engine is subject.

One problem with such pyrometers is that soot or other combustion products from the engine can build up on the exposed surface of the lens, thereby reducing the amount of radiation transmitted. Various different arrangements have been proposed to reduce this, such as by the use of a catalyst on the lens surface (GB 2121978A) or by the use of purging air (GB 1589531).

Where purge air is used, the pyrometer is provided with an open sighting tube forwardly of the lens. The pyrometer is arranged to extend across the by-pass duct of the engine, with the forward end of the sighting tube opening into the engine turbine chamber. The sighting tube is provided with air-inlet apertures so that purge air from the by-pass duct, or a separate purge source, enters the sighting tube and flows out the forward end of the tube into the turbine chamber which is at a lower pressure. The flow of clean air through the sighting tube acts to reduce the amount of contaminants entering the pyrometer from the turbine chamber. Although this arrangement does reduce contamination, it is not entirely effective because the turbulent nature of the purge air flow can allow entry of some contaminants from the forward end of the sighting tube.

BRIEF SUMMARY OF THE INVENTION

It is an object of the present invention to provide a pyrometer or similar apparatus in which fouling of the lens or other window can be reduced.

According to one aspect of the present invention there is provided radiation-responsive apparatus including a tubular member having a forward portion that is open at its forward end, and a rear portion having a radiation-transparent window therein, said rear portion having a greater internal cross-sectional area than said forward portion, a gas passage having gas inlet means located rearwardly of the forward end of the tubular member and arranged such that some at least of the gas supplied to said inlet means flows forwardly along said passage and across the forward end of said tubular member such that a substantially constant pressure is established within the rear portion of the tubular member. In this way, entry of contaminants to the tubular member can be reduced.

The gas passage may be of annular form and extend around the outside of the forward end at least of said inner tubular member. Preferably the apparatus includes an outer tubular member that extends coaxially of the said forward portion, said annular passage being defined between the external surface of the said forward portion and the internal surface of the said outer tubular member. The outer tubular member may have an inturned lip which defines a gap with the forward end of said forward portion, gas flow out of the said outer tubular member occuring via said gap. The gas inlet means may be located in the said outer tubular member, the area of the gas inlet being greater than the area of the said gap. The inturned lip preferably has a rounded internal corner.

The outer tubular member preferably has an aperture at its forward end that is smaller than the external diameter of the said forward portion and that is larger than the internal diameter of the said forward portion. The inner tube may have an internal step between its rear portion and its forward portion and the step may be inclined. The radiation-transparent window may be a lens.

According to another aspect of the present invention there is provided a radiation pyrometer according to the said one aspect of the present invention, including fibre-optic cable means and means for focussing radiation passing along said inner tubular member onto an end of the said fibre-optic cable means.

A radiation pyrometer, according to the present invention, for a gas-turbine engine, will now be described, by way of example, with reference to the accompanying drawings.

BRIEF DESCRIPTION OF THE DRAWINGS

FIG. 2 illustrates a part of an alternative pyrometer.

DETAILED DESCRIPTION

Figure 1:
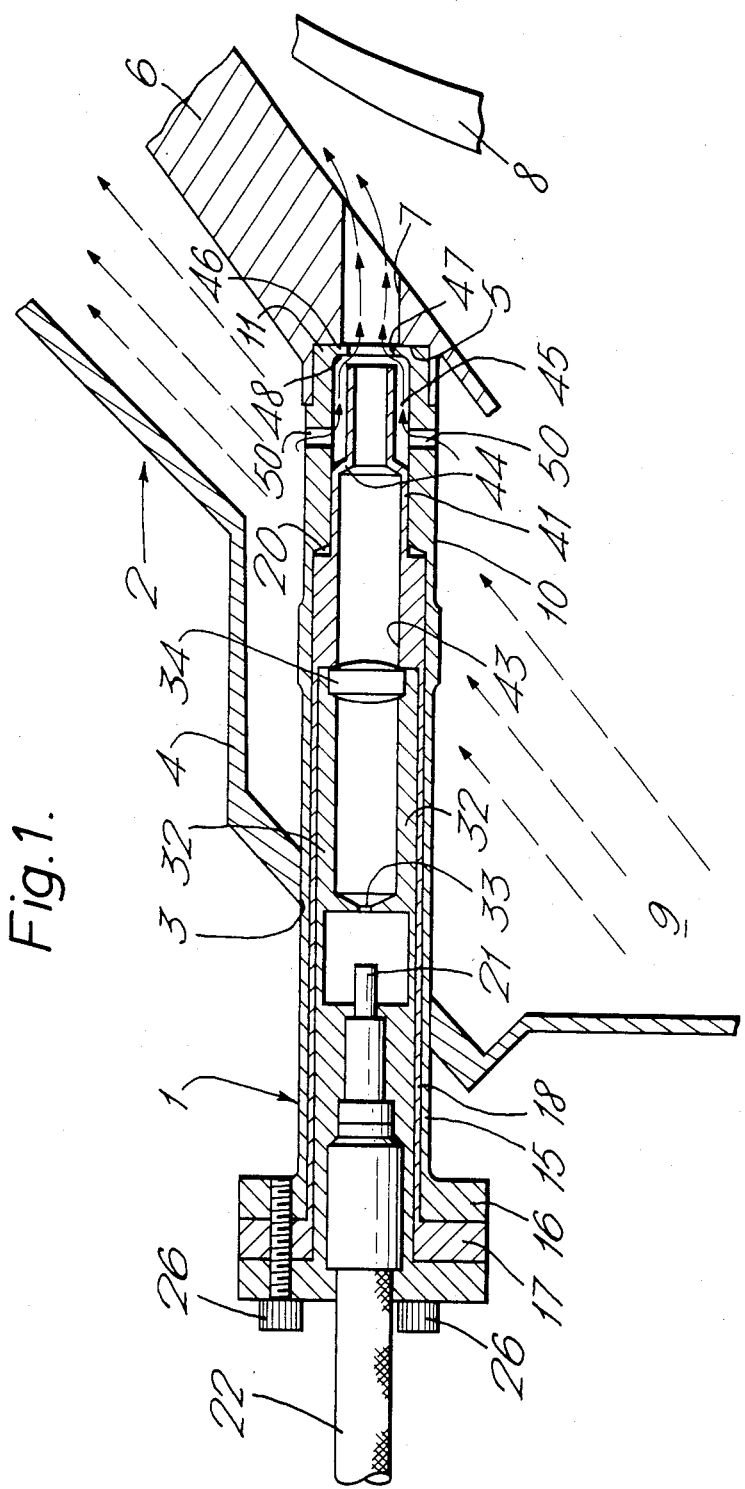
FIG. 1 is a sectional elevation of the pyrometer.

With reference to FIG. 1, the pyrometer 1 is of generally cylindrical shape and is mounted in the gas-turbine engine 2 with its forward end 10 projecting through an aperture 3 in the engine outer casing 4. The nose 11 of the pyrometer 1 is located by engagement with an annular seat 5 formed in the turbine chamber wall 6, in alignment with a sighting bore 7 through which the turbine blades 8 can be viewed.

The pyrometer 1 has an outer sleeve 15 of a corrosion-resistant steel alloy that extends the entire length of the pyrometer. At its rear end, the sleeve 15 is formed with a flange 16 to which a similar flange 17 on an inner sleeve 18 is secured. The inner sleeve 18 is of stainless steel and extends substantially the entire length of the outer sleeve 15. A short gap 20 is provided near the forward end of the inner sleeve 18 to allow for axial thermal expansion between the inner and outer sleeves 18 and 15.

The forward end 21 of a fibre-optic cable 22 is secured within the rear of the pyrometer, in the rear of a lens tube 32. Bolts 26 hold the lens tube 32 and the inner and outer sleeves 18 and 15 together. The lens tube 32 is of a corrosion-resistant steel alloy, and supports a sapphire lens 34 which is sealed about its edge to the forward end of the tube.

The part of the inner sleeve 18 forwardly of the lens 34 forms a sighting tube 41. The sighting tube 41 has an internal diameter of about 12 mm at its rear end 43 and is stepped to a diameter 8 mm about half way along its length, by means of an inclined shoulder 44. The larger diameter, rear part of the sighting tube 41 is a close fit within the outer sleeve 15. The outer surface of the sighting tube 41 is of reduced diameter at its forward end, thereby leaving an annular passage 45 between the sighting tube and the outer sleeve 15.

The tip of the outer sleeve 15 has an inturned lip 46 which defines a circular aperture 47 of diameter 9 mm. The aperture 47 is larger than the internal diameter of the forward end of the sighting tube 41, but smaller than its external diameter. The lip 46 is formed with a rounded internal corner 48 and is separated from the end of the sighting tube by about 1 mm. Six purge air inlet holes 50 are equally distributed about the outer sleeve 15, allowing entry of gas from the engine by-pass duct 9 to the rear of the annular passage 45 and rearwardly of the forward end of the sighting tube 41. The combined area of these six purge air inlet holes 50 is significantly larger than the area of the gap, that is, the smallest gap, formed between the end of the sighting tube 41 and the lip 46.

In operation, radiation from the turbine blades 8 within the field of view of the pyrometer 1, passes through the sighting bore 7 and the aperture 47 at the tip of the pyrometer. The radiation is focussed by the lens 34 onto the end 21 of the cable 22. The field of view of the pyrometer is defined by the size and shape of a mask 33 in the lens tube 32, in front of the cable 22. Radiation is transmitted along the cable 22 to a detector (not shown) which provides an output in accordance with temperature.

Purge air is supplied to the by-pass duct 9 at a pressure significantly greater than the gas pressure in the turbine chamber. This enters the annular passage 45 between the sighting tube 41 and the outer sleeve 15 via the purge air inlet holes 50. The gas flows forwardly along the passage 45, being diverted by the lip 46 so that a part at least of the gas flows across the forward end of the sighting tube 41 and out of the reduced diameter aperture 47. Gas flowing past the forward end of the sighting tube 41 tends to draw gas out of the sighting tube causing a slight reduction in pressure within the larger diameter, rear part of the sighting tube.

The major part of contaminants is prevented from entering the pyrometer by virtue of the gas flow out of the pyrometer and along the sighting bore 7. Residual contaminants, however, might enter the sighting bore 7 and the aperture 47 at the tip of the pyrometer because of turbulence in the gas flow. The arrangement described above has been found to reduce the contamination of the surface of the lens 34. The precise mechanism by which this is achieved is not clearly understood although it is thought that it may in part be caused by the establishment of a resonant column of gas within the sighting tube 41 when the flow of gas is sufficient. The frequency of any such resonant column is dependent on the dimensions of the tube, the nature of resonant gas columns being such that there is substantially constant pressure at any point along the column and no overall mass transfer of gas along the column. The resonant gas column in the sighting tube 41 is thereby thought to reduce the amount of any such contaminants entering the tube and being deposited on the lens 34.

At lower gas flows, insufficient to set up a resonant column, it is thought that any turbulence in gas flow at the tip of the sighting tube 41 is confined to the forward, smaller part of the sighting tube, the step between the forward part of the tube and the larger rear part of the tube providing, in effect, a barrier to any turbulence.

Various alternative configurations are possible, as shown in FIG. 2. In the arrangement shown in FIG. 2, the sighting tube 141 is stepped to a narrow opening 142 close to its forward end. Purge gas is supplied to an annular passage 145 between the sighting tube 141 and an outer sleeve 146. The outer sleeve 146 has a region 147 of reduced diameter at the tip of the sighting tube 141 and extends forwardly of the sighting tube.

It will be appreciated that the present invention is not restricted to pyrometers but could be used in other apparatus having an optical window prone to fouling. In this respect, the invention is not restricted to use with radiation sensors but could find application in radiation emitting apparatus, so as to reduce fouling of a transmission window.

What we claim is:

1. Radiation-responsive apparatus including an inner tubular member having a forward portion and a rear portion, the tubular member being closed except for an opening at the forward end of the forward portion, the rear portion having a radiation-transparent window therein at its rear end, the internal cross-sectional area of said rear portion being greater than the internal cross-sectional area of said forward portion, said rear portion and said forward portion being separated from one another by an internal annular step, the apparatus including a gas passage, said gas passage having gas inlet means located rearwardly of the forward end of said forward portion, said gas passage being located such that at least some of the gas supplied to the inlet means flows forwardly along said passage, said passage having a surface formation that directs at least some of the gas across the forward end of said inner tubular member to establish a substantially constant gas pressure within the said rear portion of the inner tubular member.

2. Radiation apparatus according to claim 1, including an outer tubular member that extends coaxially of the forward portion of the said inner tubular member, the said gas passage being defined between the said inner tubular member and the said outer tubular member, and the said gas passage being of annular shape.

3. Radiation-responsive apparatus according to claim 2 wherein the said surface formation is an inturned annular lip on said outer tubular member, the said lip defining a gap with the forward end of the inner tubular member so that gas flow out of the said outer tube occurs via the said gap.

4. Radiation-responsive apparatus according to claim 3, wherein the said gas inlet means is located in the said outer tubular member, and wherein the area of the said gas inlet means is greater than the area of the said gap.

5. Radiation-responsive apparatus according to claim 2, wherein the said outer tubular member has an aperture at its forward end that is smaller than the external diameter of the forward portion of the said inner tubular member.

6. Radiation-responsive apparatus according to claim 5, wherein the said aperture is larger than the internal diameter of the said forward portion of the said inner tubular member.

7. Radiation-responsive apparatus according to claim 1, wherein the said internal step is inclined.

8. Radiation-responsive apparatus according to claim 1, wherein the said radiation-transparent window is a lens.

9. A radiation pyrometer including: an inner tube having a forward portion and a rear portion separated by an internal step, the tube being closed except for an opening at the forward end of the forward portion, the rear portion having lens means therein at its rear end, the internal cross-sectional area of the rear portion being greater than that of the forward portion, said rear portion and said forward portion being separated from one another by an internal annular step; and an outer tubular member extending coaxially of and spaced from the forward portion of the said inner tubular member to define an annular gas passage therebetween, said outer tubular member having gas inlet means into said annular gas passage, said gas inlet means being located rearwardly of the forward end of said forward portion, said outer tubular member having an annular inturned lip that defines a gap with the forward end of the inner tubular member so that gas supplied to said gas inlet means flows along said gas passage and across the forward end of said inner tubular member via said gap such as to establish a substantially constant gas pressure within the said rear portion of the inner tubular member.

* * * * *